(12) United States Patent
Cash (10) Patent No.: US 9,068,878 B2
(45) Date of Patent: Jun. 30, 2015

(54) VEHICLE WEIGHT SENSOR BASED ON WHEEL RIM STRAIN MEASUREMENTS

(71) Applicant: Michael F Cash, Mountain View, CA (US)

(72) Inventor: Michael F Cash, Mountain View, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 203 days.

(21) Appl. No.: 13/974,957

(22) Filed: Aug. 23, 2013

(65) Prior Publication Data
US 2015/0053487 A1 Feb. 26, 2015

(51) Int. Cl.
| | | |
|---|---|---|
| *G01G 19/12* | (2006.01) | |
| *G01G 19/03* | (2006.01) | |
| *G01G 9/00* | (2006.01) | |
| *G01L 1/22* | (2006.01) | |
| *G01L 5/00* | (2006.01) | |
| *G01G 23/37* | (2006.01) | |
| *G01L 5/16* | (2006.01) | |
| *G07C 5/08* | (2006.01) | |

(52) U.S. Cl.
CPC .............. *G01G 19/12* (2013.01); *G01L 5/161* (2013.01); *G01L 1/2231* (2013.01); *G01G 9/00* (2013.01); *G01L 5/0019* (2013.01); *G07C 5/085* (2013.01); *G01G 23/3728* (2013.01)

(58) Field of Classification Search
CPC ..... G01G 19/08; G01G 19/12; G01G 19/035; G01G 23/3728; G01G 23/3735; G01G 9/00; G01L 1/2237; G01L 5/161; G01L 5/0019; G01L 1/2231; G07C 5/085
See application file for complete search history.

(56) References Cited

U.S. PATENT DOCUMENTS

| | | | |
|---|---|---|---|
| 3,990,032 A | 11/1976 | Fish | |
| 4,261,195 A | 4/1981 | Lockery | |
| 4,297,977 A * | 11/1981 | Boyama | 123/320 |
| 4,666,003 A | 5/1987 | Reichow | |
| 4,748,844 A * | 6/1988 | Yoshikawa et al. | 73/146 |
| 4,823,894 A * | 4/1989 | Koerner | 177/25.14 |
| D306,144 S | 2/1990 | Haggstrom | |
| 5,343,761 A | 9/1994 | Myers | |
| RE35,301 E | 7/1996 | Reichow | |
| 5,540,108 A * | 7/1996 | Cook et al. | 73/862.041 |
| 5,585,604 A * | 12/1996 | Holm | 177/133 |
| 5,677,498 A | 10/1997 | Oakes | |
| 5,811,738 A | 9/1998 | Boyovich | |
| 5,814,771 A | 9/1998 | Oakes | |
| 5,817,951 A * | 10/1998 | Cook et al. | 73/862.041 |
| D405,019 S | 2/1999 | Neuman | |
| 5,894,094 A * | 4/1999 | Kuchler et al. | 73/862.044 |
| 6,118,083 A | 9/2000 | Boyovich | |
| 6,150,617 A | 11/2000 | Hart | |

(Continued)

FOREIGN PATENT DOCUMENTS

WO 2012088405 6/2012

OTHER PUBLICATIONS

Hoogvelt, et al., "Measurement Technology for a Calibrating Vehicle for Multiple Sensor Weigh-In-Motion Systems", Proc. 8th Intl. Symp. on Heavy Vehicle Weights and Dimensions, Johannesburg, South Africa, 2004.

(Continued)

*Primary Examiner* — Randy W Gibson
(74) *Attorney, Agent, or Firm* — NUPAT, LLC; Morrison Ulman (57) ABSTRACT

A vehicle weight sensor is based on wheel-rim stress measurement.

16 Claims, 8 Drawing Sheets

(56) References Cited

U.S. PATENT DOCUMENTS

| | | | |
|---|---|---|---|
| 6,324,919 B1* | 12/2001 | Larsen et al. | 73/862.043 |
| 6,349,063 B1* | 2/2002 | Jibu | 365/189.11 |
| 6,396,003 B1 | 5/2002 | Friesen | |
| 6,525,276 B1 | 2/2003 | Vellidus | |
| 6,534,728 B1 | 3/2003 | Spikings | |
| 6,631,337 B2* | 10/2003 | Sommerfeld et al. | 702/106 |
| 6,915,708 B2* | 7/2005 | Isono | 73/862.041 |
| 7,002,083 B2 | 2/2006 | Simons | |
| 7,055,398 B2* | 6/2006 | Yuan et al. | 73/862.08 |
| 7,073,314 B2 | 7/2006 | Beck | |
| 7,166,808 B2 | 1/2007 | Viaud | |
| 7,418,362 B2* | 8/2008 | Shiraishi | 702/146 |
| 7,669,941 B2* | 3/2010 | Ai et al. | 301/105.1 |
| 7,861,599 B2 | 1/2011 | Meggiolan | |
| 2006/0037409 A1* | 2/2006 | Ichige | 73/862 |
| 2008/0271541 A1* | 11/2008 | Neuman | 73/767 |
| 2010/0256946 A1* | 10/2010 | Carresjo et al. | 702/138 |
| 2015/0019165 A1* | 1/2015 | Theuss et al. | 702/173 |

OTHER PUBLICATIONS

Matsuzaki, et al., "Intelligent Tires Based on Measurement of Tire Deformation", J. Solid Mechanics and Materials Engineering, v 2, p. 269-280, 2008.

Stearns, "An Investigation of Stress and Displacement Distribution in a Aluminum Alloy Automobile Rim", PhD thesis, University of Akron, 2000.

Stearns, et al., "Understanding the Influence of Pressure and Radial Loads on Stress and Displacement Response of a Rotating Body: The Automobile Wheel", Intl. J. Rotating Machinery, v 2006, p. 1-8, 2005.

Zoz et al., "Traction and Tractor Performance", Am. Soc. Agricultural Engineers Pub No. 913C0403, 2003.

* cited by examiner

VEHICLE WEIGHT SENSOR BASED ON WHEEL RIM STRAIN MEASUREMENTS

TECHNICAL FIELD

The disclosure is generally related to sensing vehicle weight.

BACKGROUND

Vehicle weight measurements are useful in a wide variety of applications including rail transport, heavy mining and farm operations. The weight of a salt spreader or manure truck monitored in real time helps control application rates, for example. The weight history of a grain cart or sugar cane cart is directly related to crop yield measurements. A sugar cane harvesting company, as an example, may have as many as ten harvest teams working at once. Each team may include ten trains of three cane carts that move cane from the fields to the mill where sugar is extracted. The weight of each one of the 300 carts represents valuable information for yield monitoring, load integrity, shipping cost accounting, and mill workload prediction among other uses.

Vehicles may be weighed at fixed weigh bridges or on portable weigh pads, but these measurements are available only at the location of the weighing equipment. Vehicles may also be equipped with load cells installed in the vehicle underbody or on wheel hubs. Load cells are expensive (roughly $3,000 or more per vehicle), however, and their design varies for different types of vehicles. Installing load cells often involves temporarily removing vehicle wheels, and welding fixtures into place.

Vehicles that have suspensions may weigh themselves by monitoring deflection of suspension components such as springs. However, many farm and other vehicles do not have suspensions. Tire deformation or deflection measurements are also indicative of weight on wheels, but tire measurements are affected by tire pressure, which is not always well controlled, and ground stiffness, which is highly variable in an off-road environment.

Therefore, what are needed are systems and methods for weighing vehicles. These systems should work while the vehicles are in motion or stationary. They should work on vehicles that lack suspensions and that travel slowly over soft, uneven ground. Finally, they should be inexpensive and easy to install.

DETAILED DESCRIPTION

Weight sensor systems and methods described below provide an inexpensive weighing solution for vehicles like mining trucks, train cars and slow-moving farm vehicles that may operate on soft ground. The weight sensor systems are easy to install on virtually any type of wheeled vehicle, even those without suspensions. The weight sensor systems and methods are based on strain measurements of a vehicle's metal wheel rims.

Strain in a wheel rim varies as the wheel rotates and is proportional to the weight borne by the wheel. Wheel-rim strain is largely independent of tire pressure and ground stiffness. Strain is measured by a strain gauge that may be bonded to a wheel rim with glue in just a few minutes.

Figure 1:
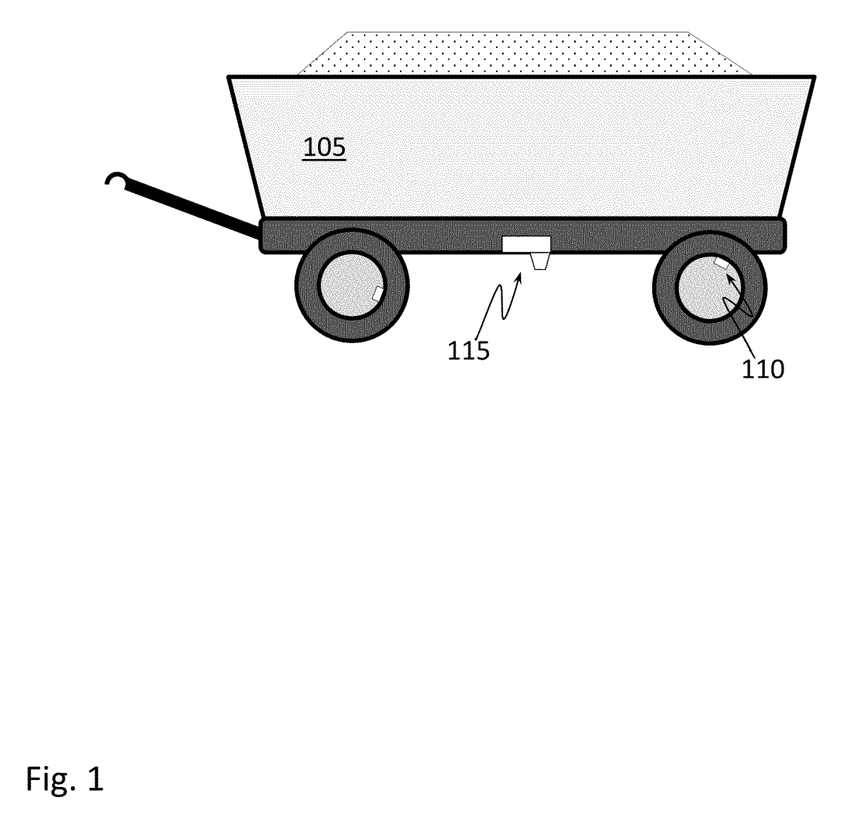
FIG. 1 shows a cart with a wireless wheel-rim strain sensor and a wireless data receiver.

FIG. 1 shows a cart 105 with a wireless wheel-rim strain sensor 110 and a wireless data receiver 115. Cart 105 is intended to be representative of any of a variety of wheeled vehicles including carts, wagons, trucks, sprayers, and the like. Sensor 110 measures strain in a metal wheel rim and sends the measurements via a wireless link to data receiver 115. The data receiver receives the strain measurements and converts them into estimates of vehicle weight.

Figure 2:
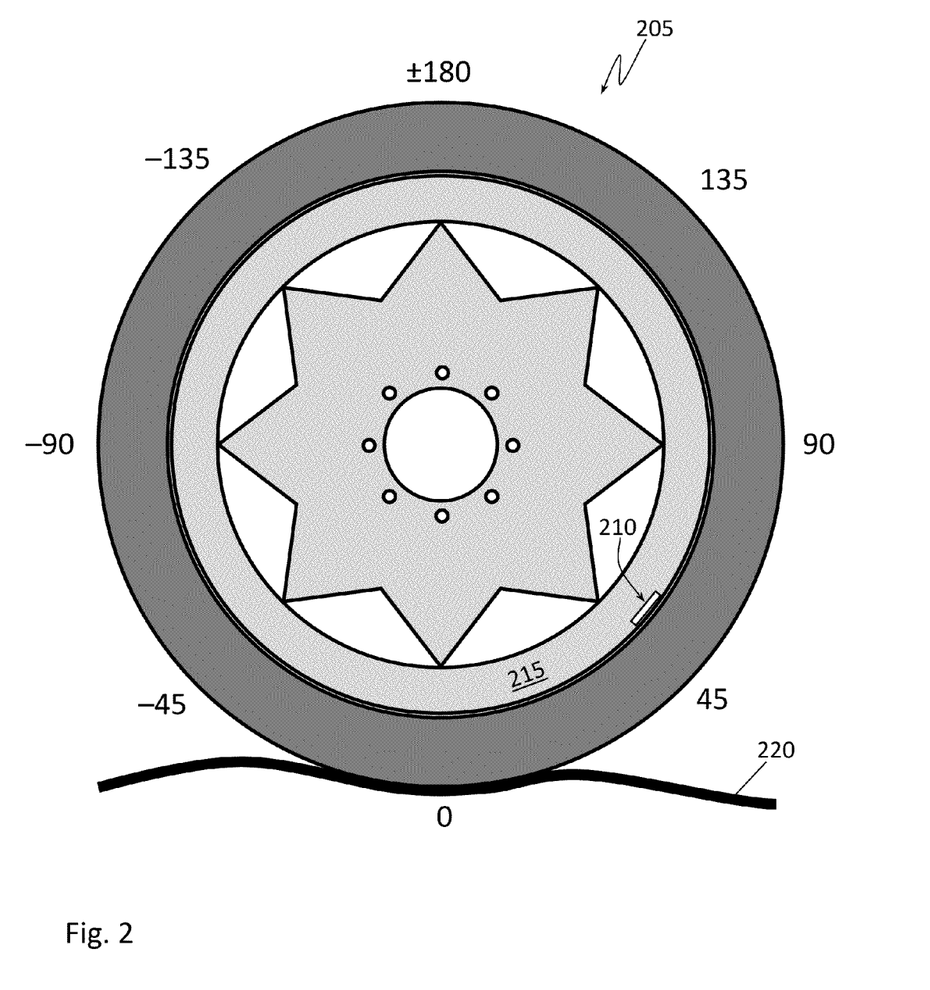
FIG. 2 is a diagram of a wheel with a rim-mounted strain gauge.

FIG. 2 is a diagram of a wheel 205 with a rim-mounted strain sensor 210. The location of sensor 210 on rim 215 is called out by a white block-arrow. Numbers "±180, −135, −90, ..., 45, 90, 135" shown around the circumference of the wheel indicate degrees of rotation away from the part of the wheel that is touching the ground. As shown in FIG. 2, wheel 205 is in contact with ground 220 about 45 degrees away from sensor 210. Sensor 210 is mounted on the outside of the bead seat of rim 215; this location is preferred, but not required.

Figure 3:
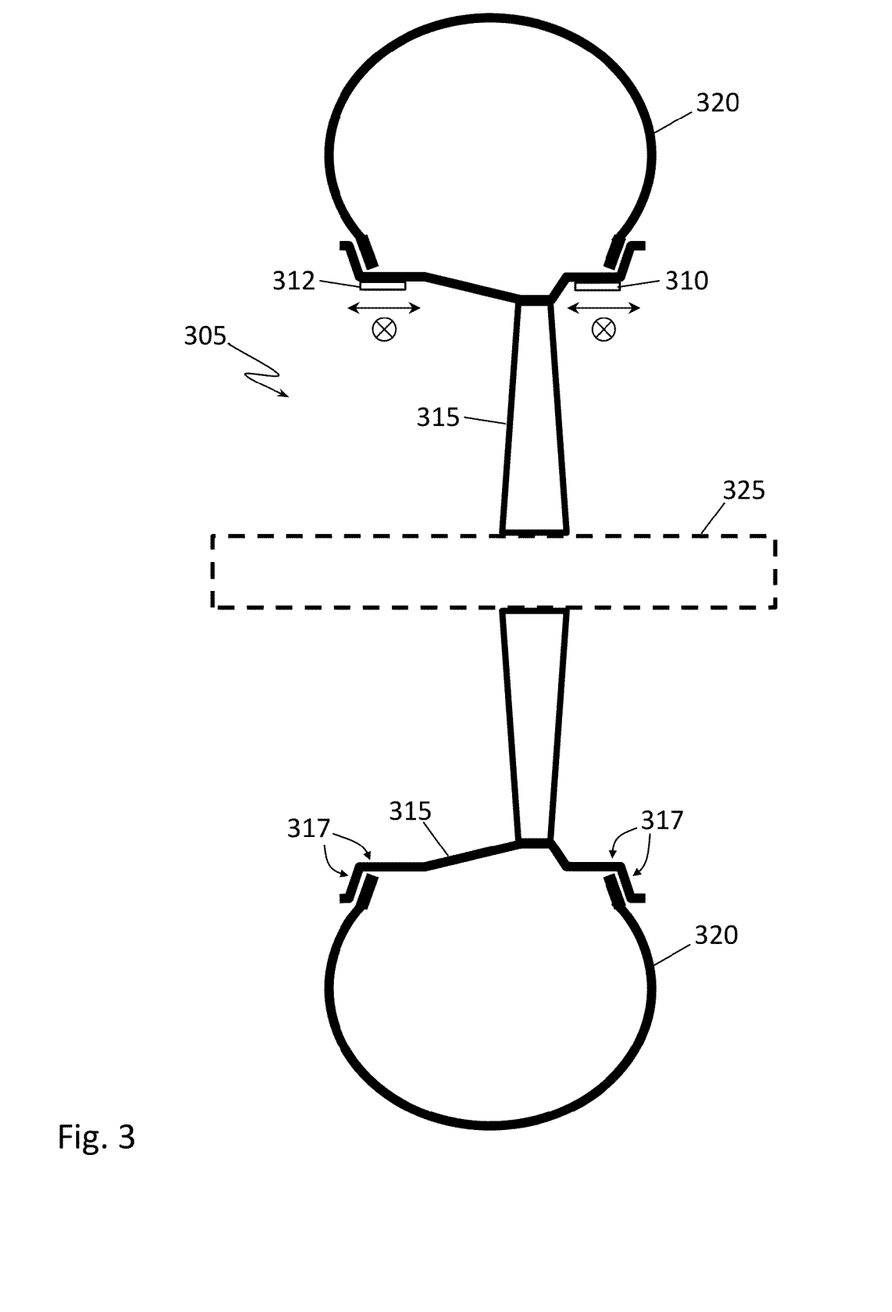
FIG. 3 illustrates strain gauge mounting locations on a cross-sectional diagram of a wheel.

FIG. 3 illustrates strain sensor mounting locations on a cross-sectional diagram of a wheel 305. Strain sensors at 310 and 312 are two examples of mounting on the outside of the bead seat 317 of wheel 315. (The bead seat is where the bead of tire 320 makes contact with rim 315.) In a typical installation only one strain sensor is needed per wheel. Sensors 310 and 312 measure strain in the axial direction as indicated by double-headed arrows, and in the tangential direction as indicated by the circumscribed X marks seen near the gauges. Wheel 315 is mounted on axle 325.

Figure 4:
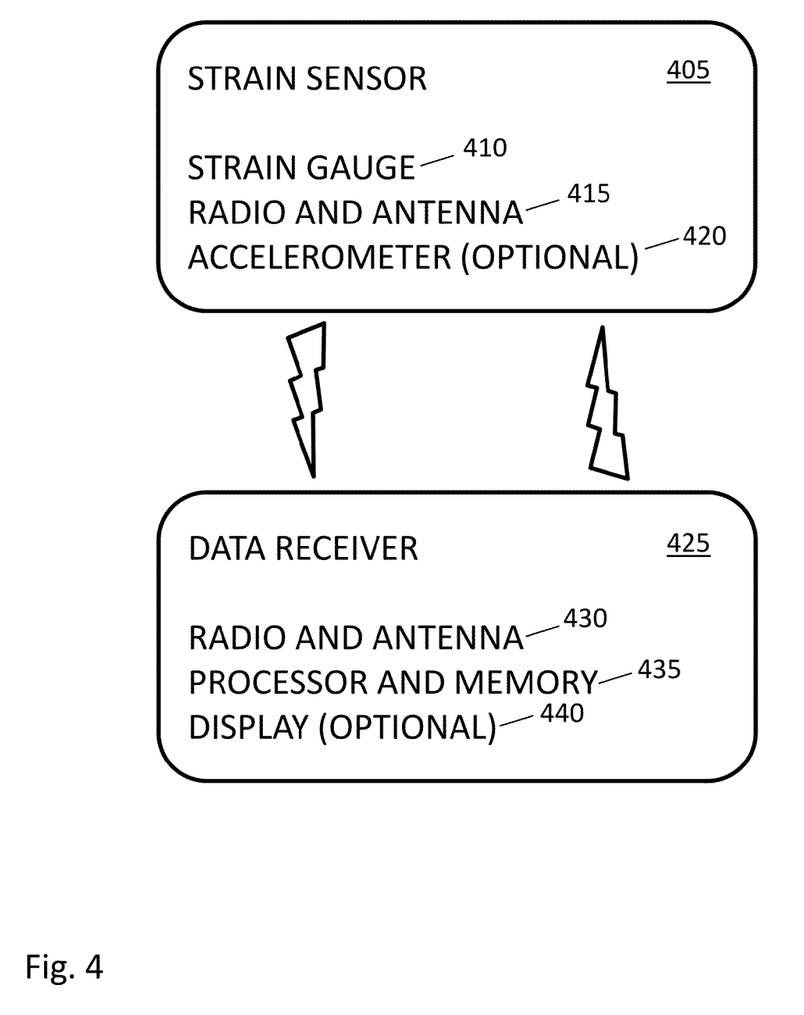
FIG. 4 is a block diagram of a vehicle weight sensor system.

FIG. 4 is a block diagram of a vehicle weight sensor system. In FIG. 4, strain sensor 405 includes strain gauge 410, and radio and antenna 415. An optional accelerometer 420 may also be included. Data receiver 425 includes radio and antenna 430, and processor and memory 435. An optional display 440 may also be included. Strain sensors 110, 210, 310 (and 312) are examples of sensors like sensor 405. Data receiver 115 is an example of a data receiver like 425.

Examples of strain gauges appropriate for use in sensor 405 are discussed in connection with FIG. 5 below. Radio and antenna 415 may be part of an off-the-shelf wireless data link based on WiFi, Bluetooth, Zigbee or similar wireless standards. Accelerometer 420 may be an integrated microelectromechanical (MEMS) accelerometer. Strain sensor 405 sends strain data to receiver 425. The sensor may also receive signals from the receiver.

Data receiver 425 receives strain data from sensor 405 and converts it into weight estimates. Radio and antenna 430 may be part of an off-the-shelf wireless data link based on WiFi, Bluetooth, Zigbee or similar wireless standards. Processor and memory may be part of any common microcontroller development platform. Display 440 is optional. When provided, it may be used to display weight data or system status information to an operator. Receiver 425 may also include other communications options such as USB ports.

When accelerometer 420 is included with strain sensor 405 it may be used to obtain wheel angle and/or wheel rotation rate. These parameters are useful for power management among other functions. A typical MEMS accelerometer draws much less electrical power than either a strain gauge or a radio that is part of a wireless data link. In many farming applications, for example, vehicle weight is needed during field operations, but not during road transport. Thus when accelerometer wheel rotation data indicate that a vehicle is moving faster than a threshold speed (e.g. 5 mph), a strain sensor may turn its strain gauge and radio off to save power. Similarly, when a vehicle is stopped, wheel angle information from an accelerometer may be used by a processor to convert strain to weight as discussed in connection with FIG. 6 below.

Figure 5A:
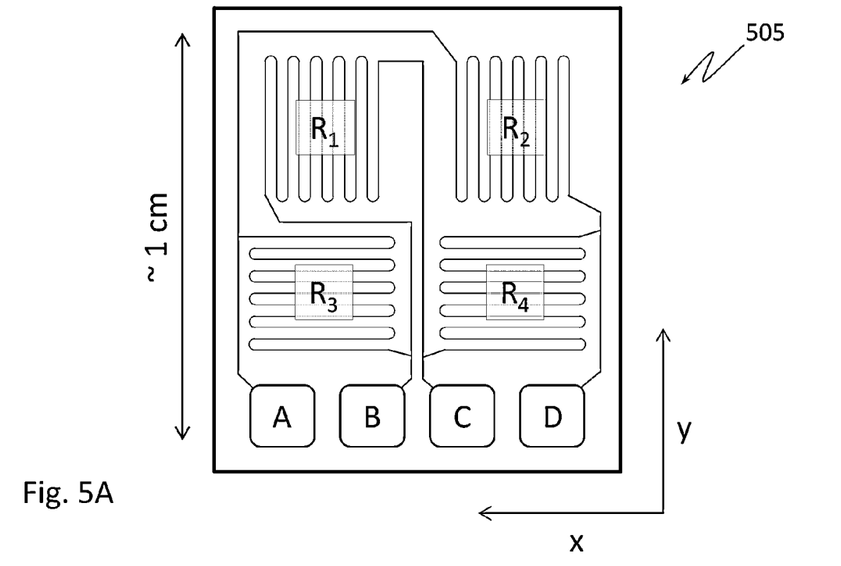
FIG. 5A is a diagram of a strain gauge.
Figure 5B:
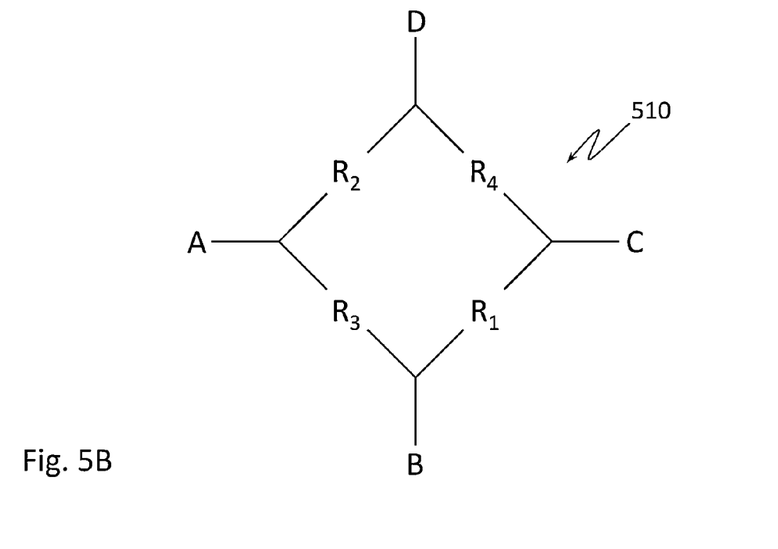
FIG. 5B is a diagram of the equivalent electrical circuit.

FIG. 5A is a diagram of a strain gauge 505 that may be used in a strain sensor such as sensor 405; FIG. 5B is a diagram of the equivalent electrical circuit. Dimensions ("1 cm" by "1 cm") for gauge 505 shown in the figure are rough approximations only. Gauges larger or smaller by a factor of two or three are common. Strain gauge 505 is configured as a full Wheatstone bridge which tends to cancel thermal drift and off-axis error sources. Two resistive strain elements, $R_1$, $R_2$, measure strain along on axis while two other resistive strain elements, $R_3$, $R_4$, measure strain along a perpendicular axis. This configuration provides additional strain sensitivity according to Poisson's ratio of the material under test; e.g. a steel wheel rim. A, B, C, D are pads for electrical connections. Gauge 505 may be bonded to a wheel rim with epoxy glue or another adhesive. While a full bridge is most accurate, a single-leg bridge is less expensive and is adequate for some applications.

FIG. 5B shows the equivalent circuit 510 for gauge 505. When a voltage is applied across terminals D and B, for example, voltage measured between terminals A and C is proportional to strain. An increase in strain in the y direction, which elongates $R_1$, $R_2$ and increases their resistance (and a corresponding decrease in strain in the x direction which decreases $R_3$, $R_4$) leads to a voltage increase at C and decrease at A.

Figure 6:
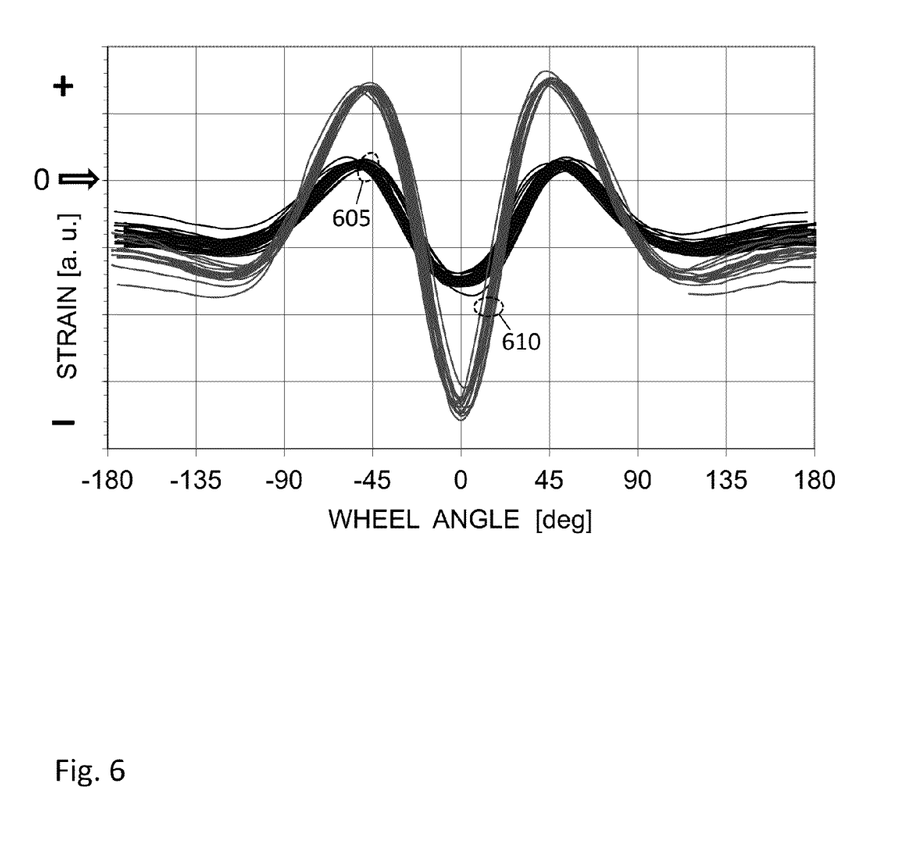
FIG. 6 is a graph of measured wheel-rim strain versus wheel angle for two different vehicle weights.

FIG. 6 is a graph of measured wheel-rim strain versus wheel angle for two different vehicle weights. Wheel angle is measured in degrees away from vertical as shown in FIG. 2. Strain is graphed in arbitrary units with zero strain being indicated by the block arrow. Positive values represent compression while negative values represent tension. Maximum tangential tension occurs in the part of the rim that lies between the axle and the ground. Maximum tangential compression occurs about 45 degrees before and after this point.

FIG. 6 shows data from many wheel rotations of a spray cart. Data obtained for an empty, lightweight cart are represented by curves passing through dashed oval 605 while those obtained for a full, heavier cart are represented by curves passing through dashed oval 610.

Wheel angle may be inferred from the cyclic nature of strain curves or it may be measured using an accelerometer. In the latter case, strain data from a stopped vehicle may be converted to weight depending upon the wheel angle identified with accelerometer data.

Vehicle weight is proportional to the amplitude of the strain curve. It may be estimated from one or a few points on the curve during one wheel cycle; e.g. the maximum amplitude of the curve which occurs at zero degrees wheel angle. Alternatively weight may be estimated from the peak-to-peak amplitude (maximum minus minimum) of the strain curve. Weight may also be estimated by integrating the strain curve over one or more wheel rotation cycles.

Calibration may be performed by measuring the strain curve for maximum and minimum vehicle weight for any particular vehicle. For example if the peak-to-peak amplitude is 3 units of strain for a vehicle weight of 8,000 lbs and 7 units of strain for a vehicle weight of 12,000 lbs, then the weight of the vehicle may be estimated as: weight [lbs]=([number of units of peak-to-peak strain amplitude]−3)×1,000+8,000. This kind of weight estimate calculation may be performed in a processor in a strain sensor (e.g. 405), a data receiver (e.g. 425) or elsewhere. Calibration may be more accurate when strain data for more different known vehicle weights are available.

Figure 7:
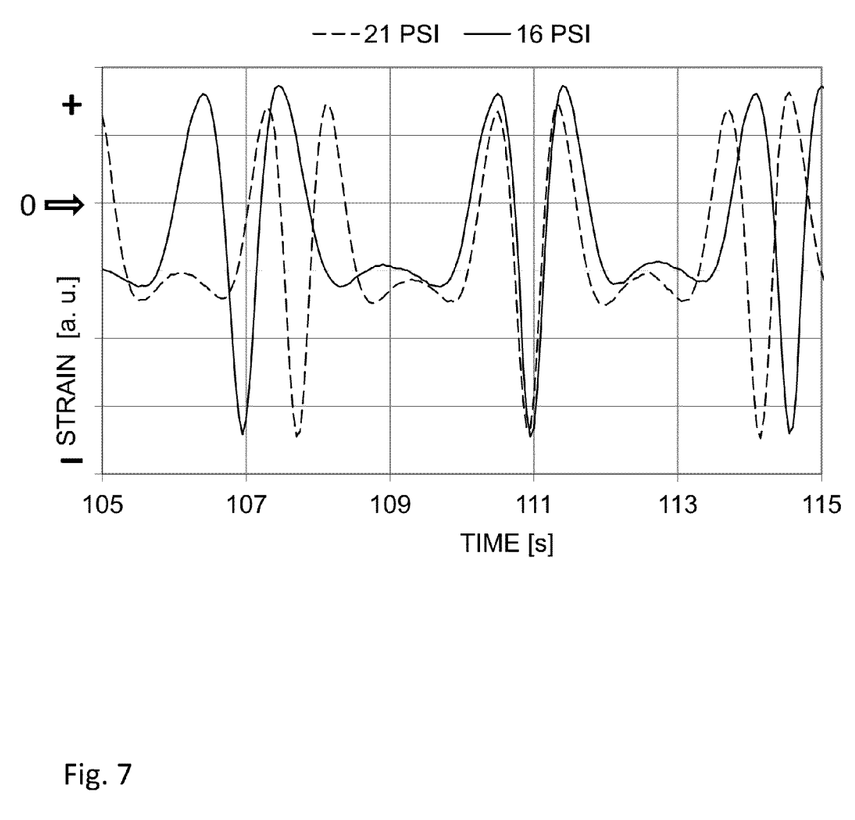
FIG. 7 is a graph of measured wheel-rim strain versus time for two different tire pressures.

Unlike tire deflection data, wheel rim strain is relatively insensitive to tire pressure. FIG. 7 is a graph of measured wheel-rim strain versus time for two different tire pressures. In FIG. 7, strain is plotted in arbitrary units versus time in seconds for a wheel on a slow-moving (1~2 mph) vehicle. Positive values represent compression while negative values represent tension. The solid curve was obtained when the tires on the vehicle were inflated to 16 pounds per square inch while the dashed curve was obtained when the tire pressure was 21 pounds per square inch. Inspection of the graph reveals only a small difference in the amplitudes of the strain curves measured under different inflation conditions.

Figure 8:
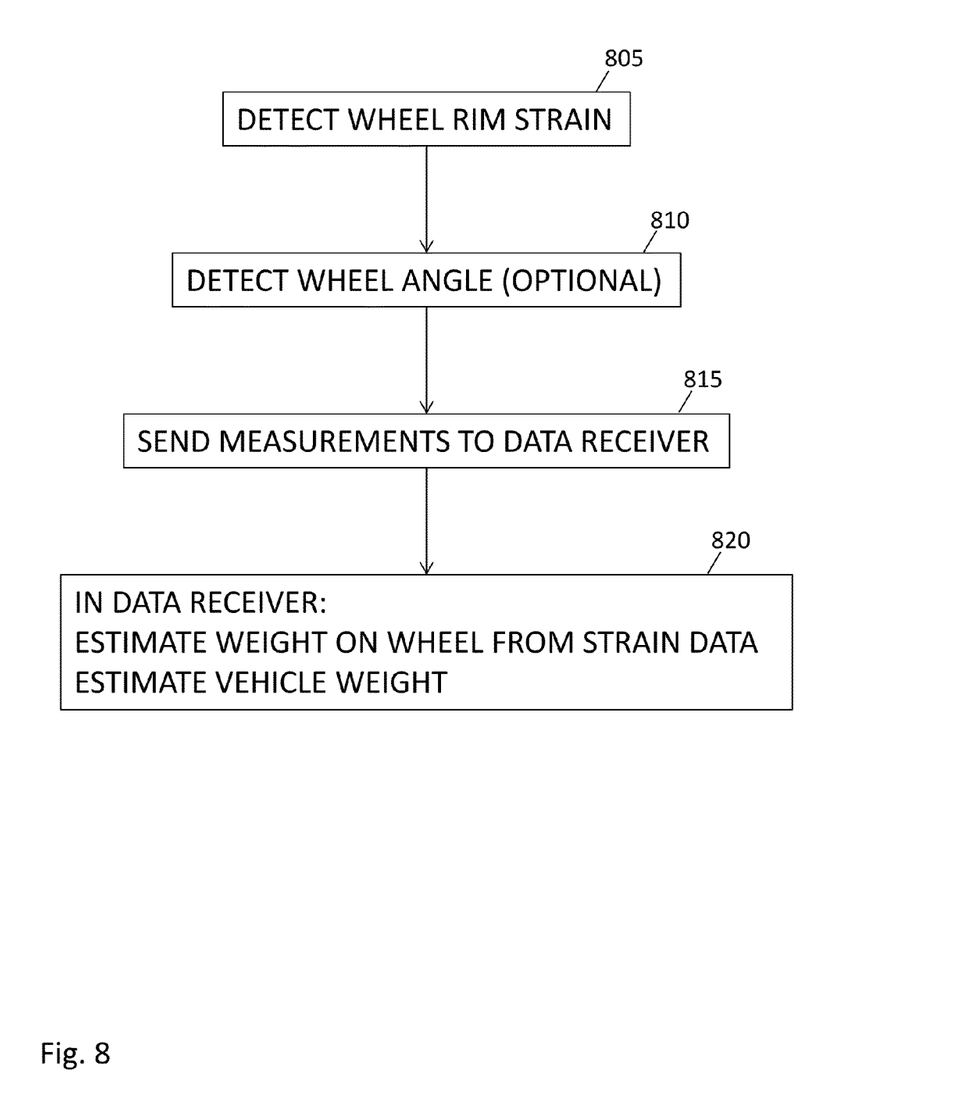
FIG. 8 is a flow chart that outlines a method for estimating vehicle weight.

FIG. 8 is a flow chart that outlines a method for estimating vehicle weight. In FIG. 8, step 805 is detecting wheel rim strain. Optional step 810 is detecting wheel angle. Step 815 is sending measurements to a data receiver, and finally step 820 is estimating weight on a wheel from strain data and/or estimating vehicle weight. Step 820 is normally performed by a processor in a data receiver.

Detecting wheel strain (805) is done using a strain sensor (e.g. 405) including a strain gauge (e.g. 505) mounted on a metal wheel rim, preferably on the outside surface of the bead seat as shown in FIGS. 2 and 3. Wheel angle may be detected (810) using a MEMS accelerometer. Wheel angle detection is optional, but when it is available it may be used for either or both of two purposes: first, as a way to determine what part of a strain curve (e.g. curves like those shown in FIG. 6) is being measured by a strain gauge; second, as a way to detect wheel speed and thereby turn off a power-hungry strain gauge and/or radio data link when a vehicle is moving rapidly. Measurements are sent (815) to a data receiver via wireless data link. The measurements may be raw strain measurements or estimated weight on a wheel. Weight on a wheel or vehicle total weight is estimated (820) using a processor in a data receiver. Total vehicle weight may be estimated as a sum of estimated weights-on-wheels if all or several of the wheels of a vehicle are equipped with strain sensors. Alternatively total vehicle weight may be estimated as a function of the weight on one wheel. For example, if a vehicle has four wheels, only one of which is equipped with a strain sensor, total vehicle weight may be estimated as four times the weight on the sensor-equipped wheel. More complicated estimation methods may be derived with additional information on typical vehicle weight distribution among its wheels.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:
1. A system for measuring vehicle weight comprising:
   a strain sensor including a strain gauge and a radio transmitter that transmits strain data;
   a data receiver including a radio receiver that receives strain data and a processor and memory;

wherein, the processor uses the strain data to estimate weight on a wheel of the vehicle having a metal wheel rim, and the strain data represents strain in the wheel rim as measured by the strain gauge while the strain gauge is bonded to an outside surface of a bead seat of the wheel rim.

2. The system of claim 1, the strain data representing tangential strain in the wheel rim.

3. The system of claim 1, the strain data representing axial strain in the wheel rim.

4. The system of claim 1, the strain data representing a combination of tangential and axial strain in the wheel rim.

5. The system of claim 1, the processor estimating weight based on peak-to-peak strain amplitude as reported by the strain gauge during one or more rotations of the wheel.

6. The system of claim 1, the processor estimating weight based on integrated strain amplitude as reported by the strain gauge during one or more rotations of the wheel.

7. The system of claim 1, the sensor further comprising a microelectromechanical accelerometer that detects wheel rotation angle and rotation rate.

8. The system of claim 7, the sensor turning off its strain gauge and radio transmitter whenever the accelerometer detects a wheel rotation rate greater than a predetermined value.

9. A method for measuring vehicle weight comprising:
bonding a strain gauge of a strain sensor to an outside surface of a bead seat of a metal wheel rim of a wheel of the vehicle;
obtaining strain data representing strain in the wheel rim during one or more wheel rotations;
transmitting strain data from the strain gauge to a data receiver via radio; and,
a processor in the data receiver using the strain data to estimate weight on the wheel of the vehicle.

10. The method of claim 9, the strain data representing tangential strain in the wheel rim.

11. The method of claim 9, the strain data representing axial strain in the wheel rim.

12. The method of claim 9, the strain data representing a combination of tangential and axial strain in the wheel rim.

13. The method of claim 9 where the processor estimates weight on the wheel as a function of peak-to-peak strain amplitude.

14. The method of claim 9 where the processor estimates weight on the wheel as a function of integrated strain amplitude.

15. The method of claim 9 further comprising obtaining wheel rotation angle data using an accelerometer included in the strain sensor and the processor estimating weight on the wheel as a function of wheel strain and rotation angle while the wheel is not moving.

16. The method of claim 9 further comprising obtaining wheel rotation rate data using an accelerometer included in the strain sensor and turning off the strain gauge and the radio whenever the wheel rotation rate exceeds a predetermined value.

* * * * *